United States Patent
Daianu et al.

(10) Patent No.: US 10,664,540 B2
(45) Date of Patent: May 26, 2020

(54) DOMAIN SPECIFIC NATURAL LANGUAGE UNDERSTANDING OF CUSTOMER INTENT IN SELF-HELP

(71) Applicant: INTUIT INC., Mountain View, CA (US)

(72) Inventors: Madelaine Daianu, San Diego, CA (US); Yao Morin, San Diego, CA (US); Jonathan Lunt, San Diego, CA (US); Joseph B. Cessna, San Diego, CA (US)

(73) Assignee: INTUIT INC., Mountain View, CA (US)

(*) Notice: Subject to any disclaimer, the term of this patent is extended or adjusted under 35 U.S.C. 154(b) by 342 days.

(21) Appl. No.: 15/844,475

(22) Filed: Dec. 15, 2017

(65) Prior Publication Data
US 2019/0188326 A1   Jun. 20, 2019

(51) Int. Cl.
*G06F 7/02* (2006.01)
*G06F 16/00* (2019.01)
(Continued)

(52) U.S. Cl.
CPC .......... *G06F 16/9535* (2019.01); *G06F 9/453* (2018.02); *G06F 16/338* (2019.01);
(Continued)

(58) Field of Classification Search
CPC ............... G06F 16/9535; G06F 16/338; G06F 16/3344; G06F 165/00; G06Q 30/016;
(Continued)

(56) References Cited

U.S. PATENT DOCUMENTS 10,331,402 B1 * 6/2019 Spector ................. G06F 16/951
2010/0191686 A1   7/2010 Wang et al.
(Continued)

FOREIGN PATENT DOCUMENTS

KR   1020060050397 A   5/2006

OTHER PUBLICATIONS

International Search Report/Written Opinon issued in PCT/US2018/044779 dated Nov. 16, 2018.

*Primary Examiner* — Bruce M Moser
(74) *Attorney, Agent, or Firm* — Patterson + Sheridan, LLP

(57) ABSTRACT

Method and apparatus for providing a personalized self-support service to a user of an online application coupled with an online community forum. Embodiments include obtaining a plurality of questions from the online community forum and obtaining historical user data. Embodiments further include identifying one or more part-of-speech words in the plurality of questions and generating a high-dimensional vector for each question of the plurality of questions based on a frequency of the one or more part-of-speech words. Embodiments further include identifying one or more user features of the plurality of users based on the historical user data and establishing, based on the historical user data, one or more statistical correlations between user features and part-of-speech words. Embodiments further include training a predictive model based on the one or more statistical correlations. Embodiments further include using the predictive model to predict to provide one or more relevant questions to the user.

21 Claims, 6 Drawing Sheets

(51) Int. Cl.
*G06F 16/9535* (2019.01)
*G06F 16/9032* (2019.01)
*G06F 40/40* (2020.01)
*G06F 40/284* (2020.01)
*G06F 9/451* (2018.01)
*G06F 16/33* (2019.01)
*G06F 16/338* (2019.01)
*G06N 5/02* (2006.01)
G06Q 10/00 (2012.01)

(52) U.S. Cl.
CPC ...... *G06F 16/3344* (2019.01); *G06F 16/3346* (2019.01); *G06F 16/3347* (2019.01); *G06F 16/90332* (2019.01); *G06F 40/284* (2020.01); *G06F 40/40* (2020.01); *G06N 5/02* (2013.01); G06Q 10/20 (2013.01)

(58) Field of Classification Search
CPC .......... G06Q 10/20; G06N 3/08; G06N 5/022; G06N 5/003; G06N 20/20
See application file for complete search history.

(56) References Cited

U.S. PATENT DOCUMENTS

2013/0282713 A1 10/2013 Lawrence
2019/0042557 A1* 2/2019 Okubo .................. G06F 17/24
2019/0163681 A1* 5/2019 Benedict ........... G06F 16/24522

* cited by examiner

| Summary | Personal Info | Federal Taxes | State Taxes | eFile |

Personal Info : Name, Address

Filing Status : Single

Adjusted Gross Income : $50,000

Federal Refund : $1000

Forms Entered or Imported: W2, 1099-INT, 1099-G

Deduction Taken : Home mortgage, Medical expenses

Credits Taken : Earned income credit

Back Account : Checking Account #*********

Personalized Q&A List

1. Question 1
2. Question 2
3. Question 3
4. Question 4
5. Question 5
6. Question 6
7. Question 7
8. Question 8
9. Question 9
10. Question 10

View More-->

Search Q&A

Fig. 4

DOMAIN SPECIFIC NATURAL LANGUAGE UNDERSTANDING OF CUSTOMER INTENT IN SELF-HELP

FIELD

The present disclosure generally relates to providing a personalized self-help experience in an online application.

DESCRIPTION OF THE RELATED ART

Online applications take many forms and cover many contexts. As the sophistication (and ubiquity) of such applications increases, so too does the volume of requests for help from users of those applications.

Historically, help with a computer application may have been provided via physical or digital "manual," such as a user's manual. More recently, online applications may include a searchable digital manual, a searchable database of questions and answers, and even a related online message board, where users can seek help from other users. However, most all of these existing solutions rely on basic word-searching and matching methodologies. Consequently, if a user lacked the right terminology for a search, or even used the wrong form of the right word in a search, the user may not find any help. And in any event, the "help" the user may find would not be personalized to the user in any aspect.

Accordingly, there exists a need for an improved approach to suggesting personalized and relevant questions and answers for customers without the need for human-assisted help.

SUMMARY

In one embodiment, a system for providing a personalized self-support service to a user of an online application coupled with an online community forum, includes a processor configured to perform operations comprising: obtaining a plurality of questions from the online community forum; obtaining historical user data comprising: clickstream data of a plurality of users who accessed at least one of the plurality of questions; profile data of the plurality of users; and application context data of the plurality of users; identifying one or more part-of-speech words in the plurality of questions from the online community forum; generating a high-dimensional vector for each question of the plurality of questions based on a frequency of the one or more part-of-speech words in the plurality of questions; identifying one or more user features of the plurality of users based on the historical user data; establishing one or more statistical correlations, based on the historical user data, between at least one of the one or more user features which is based on the application context data and one or more of the part-of-speech words; training a predictive model using at least one of the one or more user features which is based on the profile data to predict part-of-speech words based on the historical user data; determining, using the predictive model and the one or more statistical correlations, part-of-speech words relevant to the plurality of users; predicting, using the trained predictive model, the one or more statistical correlations, and the part-of-speech words relevant to the plurality of users, part-of-speech words likely to be relevant to the user of the online application based on at least one user feature of the user of the online application; generating a high-dimensional vector for the user of the online application based on the predicted part-of-speech words; computing a similarity metric between each of the high-dimensional vectors for the plurality of questions and the high-dimensional vector for the user of the online application; ranking the high-dimensional vectors for the plurality of questions in order of relevance based on the similarity metrics; and providing one or more relevant questions to the user of the online application via a user interface of the online application based on the ranking.

Another embodiment includes a computer-implemented method for providing a personalized self-support service to a user of an online application coupled with an online community forum. The method comprises obtaining a plurality of questions from the online community forum. The method further comprises obtaining historical user data comprising: clickstream data of a plurality of users who accessed at least one of the plurality of questions; profile data of the plurality of users; and application context data of the plurality of users. The method further comprises identifying one or more part-of-speech words in the plurality of questions from the online community forum. The method further comprises generating a high-dimensional vector for each question of the plurality of questions based on a frequency of the one or more part-of-speech words in the plurality of questions. The method further comprises identifying one or more user features of the plurality of users based on the historical user data. The method further comprises establishing one or more statistical correlations, based on the historical user data, between at least one of the one or more user features which is based on the application context data and one or more of the part-of-speech words. The method further comprises training a predictive model using at least one of the one or more user features which is based on the profile data to predict part-of-speech words based on the historical user data. The method further comprises determining, using the predictive model and the one or more statistical correlations, part-of-speech words relevant to the plurality of users. The method further comprises predicting, using the trained predictive model and the one or more statistical correlations, part-of-speech words likely to be relevant to the user of the online application based on at least one user feature of the user of the online application. The method further comprises generating a high-dimensional vector for the user of the online application based on the predicted part-of-speech words. The method further comprises computing a similarity metric between each of the high-dimensional vectors for the plurality of questions and the high-dimensional vector for the user of the online application. The method further comprises ranking the high-dimensional vectors for the plurality of questions in order of relevance based on the similarity metrics. The method further comprises providing one or more relevant questions to the user of the online application via a user interface of the online application based on the ranking.

In yet another embodiment, a non-transitory computer-readable storage medium contains instructions that, when executed, cause one or more processors to perform operations for providing a personalized self-support service to a user of an online application coupled with an online community forum. The operations comprise obtaining a plurality of questions from the online community forum. The operations further comprise obtaining historical user data comprising: clickstream data of a plurality of users who accessed at least one of the plurality of questions; profile data of the plurality of users; and application context data of the plurality of users. The operations further comprise identifying one or more part-of-speech words in the plurality of questions from the online community forum. The operations further comprise generating a high-dimensional vector for each question of the plurality of questions based on a frequency of the one or more part-of-speech words in the plurality of questions. The operations further comprise identifying one or more user features of the plurality of users based on the historical user data. The operations further comprise establishing one or more statistical correlations, based on the historical user data, between at least one of the one or more user features which is based on the application context data and one or more of the part-of-speech words. The operations further comprise training a predictive model using at least one of the one or more user features which is based on the profile data to predict part-of-speech words based on the historical user data. The operations further comprise determining, using the predictive model and the one or more statistical correlations, part-of-speech words relevant to the plurality of users. The operations further comprise predicting, using the trained predictive model and the one or more statistical correlations, part-of-speech words likely to be relevant to the user of the online application based on at least one user feature of the user of the online application. The operations further comprise generating a high-dimensional vector for the user of the online application based on the predicted part-of-speech words. The operations further comprise computing a similarity metric between each of the high-dimensional vectors for the plurality of questions and the high-dimensional vector for the user of the online application. The operations further comprise ranking the high-dimensional vectors for the plurality of questions in order of relevance based on the similarity metrics. The operations further comprise providing one or more relevant questions to the user of the online application via a user interface of the online application based on the ranking.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, for this disclosure may admit to other equally effective embodiments.

FIG. 4 illustrates an exemplary user interface (UI) screen of a tax preparation application in accordance with aspects of the present disclosure.

DETAILED DESCRIPTION

Figure 1:
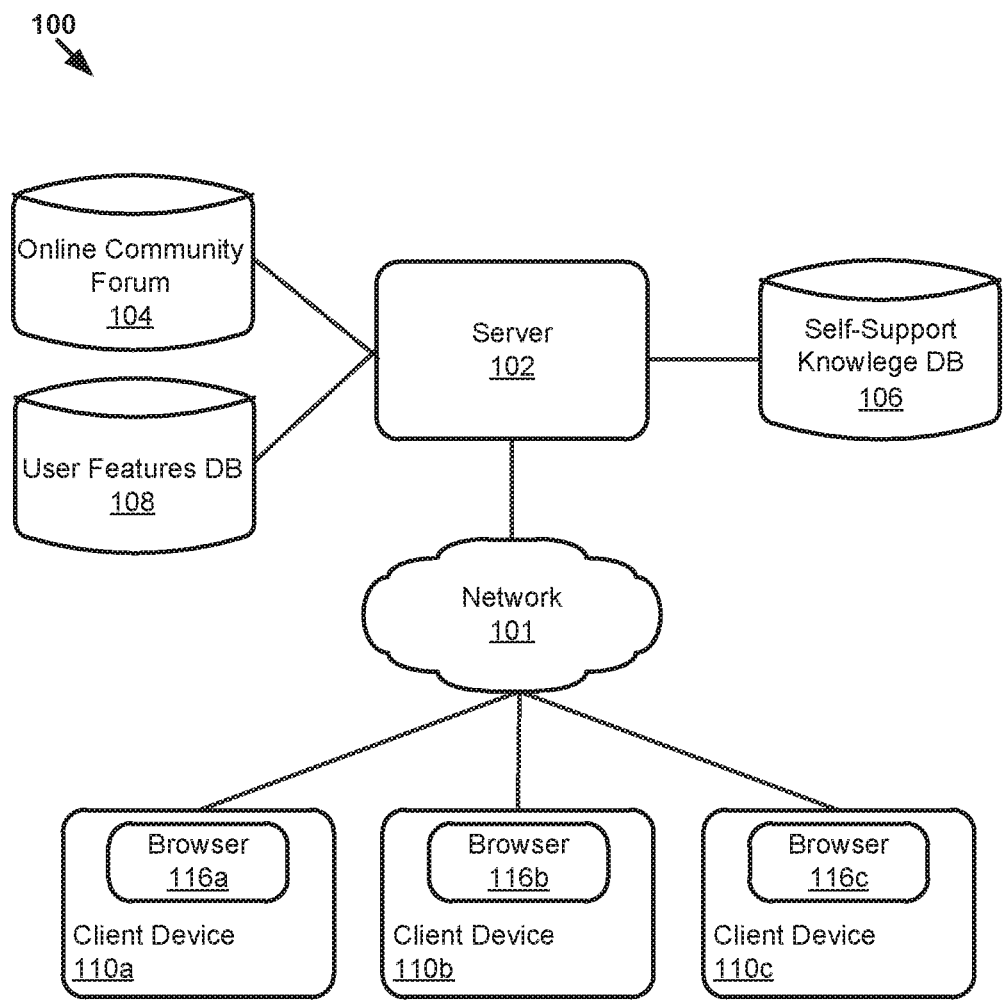
FIG. 1 illustrates an exemplary computing environment in accordance with aspects of the present disclosure.

In today's digital age, computer application users expect highly personalized features and dynamically enhanced end-to-end user experiences. Since users sometimes encounter complex and unique issues while using online applications, generating a personalized self-support knowledge base that addresses these issues can be challenging.

Automatically identifying personalized and relevant questions for customers is challenging in part due to the intricacies of language used in questions. Without human intervention, it can be difficult to identify the precise meaning of the language in a user query and to understand the relevance of particular concepts to particular users under particular circumstances during the use of an application.

Dynamic customer segmentation can reveal insights about a customer's observed behavior and the type of behaviors that similar customers would exert under comparable circumstances. For instance, an insightful customer-based model should predict the most relevant questions that a particular group of users expects to see in the self-help panel within an online application, such as TURBOTAX® (a registered trademark of Intuit, Inc.) prior to inputting any search words.

To create a capability that predicts engaging and relevant content for users, techniques described herein involve dynamic and adaptive modeling of the customer's behavior in relation to questions that similar users have previously shown interest in. Furthermore, in order to identify connections between questions and particular groups of users, embodiments of the present disclosure involve developing a systematic understanding of the language used in questions. For example, a domain-specific ontology may be constructed by identifying correlations and connections between words in order to determine concepts associated with questions. In the fields of computer science and information science, an ontology may be defined as a formal naming and definition of the types, properties, and interrelationships of the entities that really exist in a particular domain of discourse. Generally speaking, a domain-specific ontology represents concepts which belong to part of the world. Particular meanings of terms applied to that domain are provided by a domain-specific ontology. For example, the word card has many different meanings. An ontology specific to the domain of poker would model the "playing card" meaning of the word (e.g., through associations with words like "ace" and "clubs", and/or topics like "gambling" or "bluffing"), while an ontology specific to the domain of computer hardware would model the "punched card" and "video card" meanings. According to embodiments described herein, a domain-specific ontology may comprise a knowledge model representing correlations and associations among words and topics specific to a particular domain (e.g., tax preparation, online shopping, social networking, or the like).

User similarity may be defined as the overlap between the full set of features describing each user's profile and behaviors. For example, where an online application relates to tax preparation, a user's profile may include many attributes related to the user's tax situation (e.g., filing single or jointly, head-of-household, number of dependents, etc.). Further to this example, a user's behaviors, such as electing standard deductions or itemized deductions, may relate the particular user to other, users with similar profiles and/or behaviors. By segmenting customers according to their similarity in multiple aspects or dimensions (such as with respect to their profile attributes or behaviors), it is possible to more successfully predict the needs of the corresponding segments and provide personalized and proactive support.

Personalized self-support services may leverage machine learning models to provide personalized support services to users of an application, such as an online application.

Machine learning may be particularly useful in this context where the available data is diverse in types, where it is unstructured, etc., and more generally where the available data is not easily conformed to standard predictive modelling strategies.

For example, machine learning may be used to predict the most relevant set of frequently asked questions (FAQ) targeted towards distinct customer segments determined based on, for example, user profiles and behaviors. For example, a machine learning model may analyze clickstream data generated from user click activities within an online application (e.g., clicks on questions in an online community forum) to determine the most relevant questions a user is likely to ask. Furthermore, such models may dynamically adapt to the behavior of each user, for example, by adjusting to the clickstream activity of the user within the online application. Thus, personalized self-support services aim to establish a relationship between all available data about a user (e.g., profile attributes and behaviors) and the most probable questions that the user is likely to ask while using an online application, such as while preparing a tax returns.

In some embodiments, a predictive model may be trained by considering text included in questions in order to recognize relationships between words and better understand the meaning of the language used. For example, Natural Language Processing (NLP) techniques may be employed as part of a process for constructing a domain-specific ontology that identifies connections between words, extraneous terminology, words that are synonyms within the domain, words that relate to particular concepts or topics, and the like. One such example of a natural language processing model is vector space model known as term frequency inverse document frequency (tf-idf), which is a count-based method that computes the statistics of how frequently words co-occur with other neighboring words in a large corpus of text. The tf-idf model maps the count-statistics of each word in the corpus to a high-dimensional vector (i.e., 1000-dimensional vector) for each word. The vectors capture the importance of each word in a document that increase proportionally to the frequency at which that word appears in the document, and is offset by the number of times that word appears in the whole corpus of text, or documents combined. Using the NLP module 208, the most frequent part-of-speech words can be parsed from the corpus of live community forum to create vectors that embed most frequent part-of-speech words. "Part-of-speech words" may refer to words belonging to categories called word classes (or parts of speech) according to the part they play in a sentence. For example, the main parts of speech in the English language are: noun, verb, adjective, adverb, pronoun, preposition, conjunction, determiner, and exclamation. An example of a 1000-dimentional vector would include the top most frequent 1000 part-of-speech words and their frequency as computed by the tf-idf model: vector={'tax': 0.8, 'return': 0.4, 'dependents': 0.1, . . . }. Furthermore, large data sets such as, for example, a large collection of questions and answers from an online community forum, may be used to model domain-specific ontologies that enhance the relationship between the words identified in each document. Frequently occurring words, augmented through domain-specific ontologies, define topics likely to be relevant to particular groups of users. For example, such processing may enable a predictive model to predict relationships between certain user characteristics and the user's likely interaction with an application and likely support needs with respect to that application.

FIG. 1 illustrates an example computing environment for providing a personalized self-support service in accordance with embodiments of the present disclosure.

As illustrated, computing environment 100 includes a server 102, an online community forum 104, a self-support knowledge database 106, a user features database 108, and a plurality of client devices 110a-c, each running a browser 116a-c (respectively). These entities in computing environment 100 are in connection with one another via a network 101, such as a local area network or wide area network (e.g., the Internet). While the entities are depicted separately, certain components may be implemented either together or separately.

Server 102 comprises a physical or virtual server device (for example, in a data center) that executes online applications, including one or more services that perform functions associated with online applications (e.g., 116a-c). In some embodiments, server 102 trains and operates a predictive model for providing personalized self-support questions and answers to each user. Training the predictive model may involve constructing a domain-specific ontology based on questions and answers (e.g., from online community forum 104 and/or self-support knowledge database 106), the domain-specific ontology identifying correlations, such as those among words and topics. For example, the domain-specific ontology may determine that, within a particular domain (e.g., tax preparation), certain words are connected (e.g., "filing" and "return") or synonymous (e.g., "claim" and "deduct"). The domain-specific ontology may further identify relationships between certain words and certain concepts or topics in order to appropriately determine the topics at issue in particular questions. Server 102 may use the domain-specific ontology to train the predictive model by identifying correlations between certain topics and sets of user characteristics.

Online community forum 104 may be an online support community for an online application. Online community forum 104 includes a repository storing self-support data, such as forum posts, frequently asked questions (FAQ), questions and answers, technical documentation, tutorials, wiki page entries, links to external websites, and the like. The repository may also store data about users' interactions with the online community forum 104, such as profile information, clickstream information, and the like. In one embodiment, questions and answers from the online community forum 104 are stored as high-dimensional vectors in server 102. In some embodiments, the high-dimensional vectors may be stored in a database, a look-up table, or the like.

Self-support knowledge database 106 may store self-support data such as questions and answers, tutorials, and the like (e.g., composed by support professionals or generated based on questions and answers from the live community forum 104). In some embodiments, the self-support data may be stored in the form of high-dimensional vectors similarly to the questions and answers from the online community forum 104 above. In one embodiment, a list of the high-dimensional vectors representing each of the self-support data is stored in the form of a lookup table in server 102.

Server 102 obtains incoming user data when a user interacts with an online application on a client device 110 through a browser 116. In some embodiments, server 102 receives user data real-time while a user interacts with the online application. Thereafter, server 102 processes the user data and uses the predictive model to return one or more of the most relevant questions and any associated answers to the client device. For example, server 102 can provide a certain number of most relevant questions to the client device, such as the top ten questions, or other numbers as necessary or available. In some cases, the predictive model may only return a question title or subject, which may be a hyperlink to a full discussion of the question and any associated answers. Such compact representations of questions may be preferable where an area of a graphical user interface, such as a side pane, has limited screen space to show a plurality of related questions. This is particularly important when a user is accessing an application from a mobile device that may have a relatively smaller screen size. For similar reasons, the number of questions displayed may be limited. For example, a maximum number of returned question titles may be set (e.g., ten),though in some cases there may only be five relevant questions. In such a case, only five questions would be returned.

Each client device 110a-c may be a physical or virtual computing entity, such as a mobile device, a cellular phone, a smart phone, a tablet, a laptop computer, a desktop computer, a personal digital assistant (PDA), or the like. In the depicted embodiment, each client device 110a-c is equipped with a browser 116a-c that provides access to an online application running on server 102 over network 101. A user experiencing an issue or problem with, for example, application 116a on client device 110a can seek support through the personalized self-support service implemented by server 102.

Figure 2A:
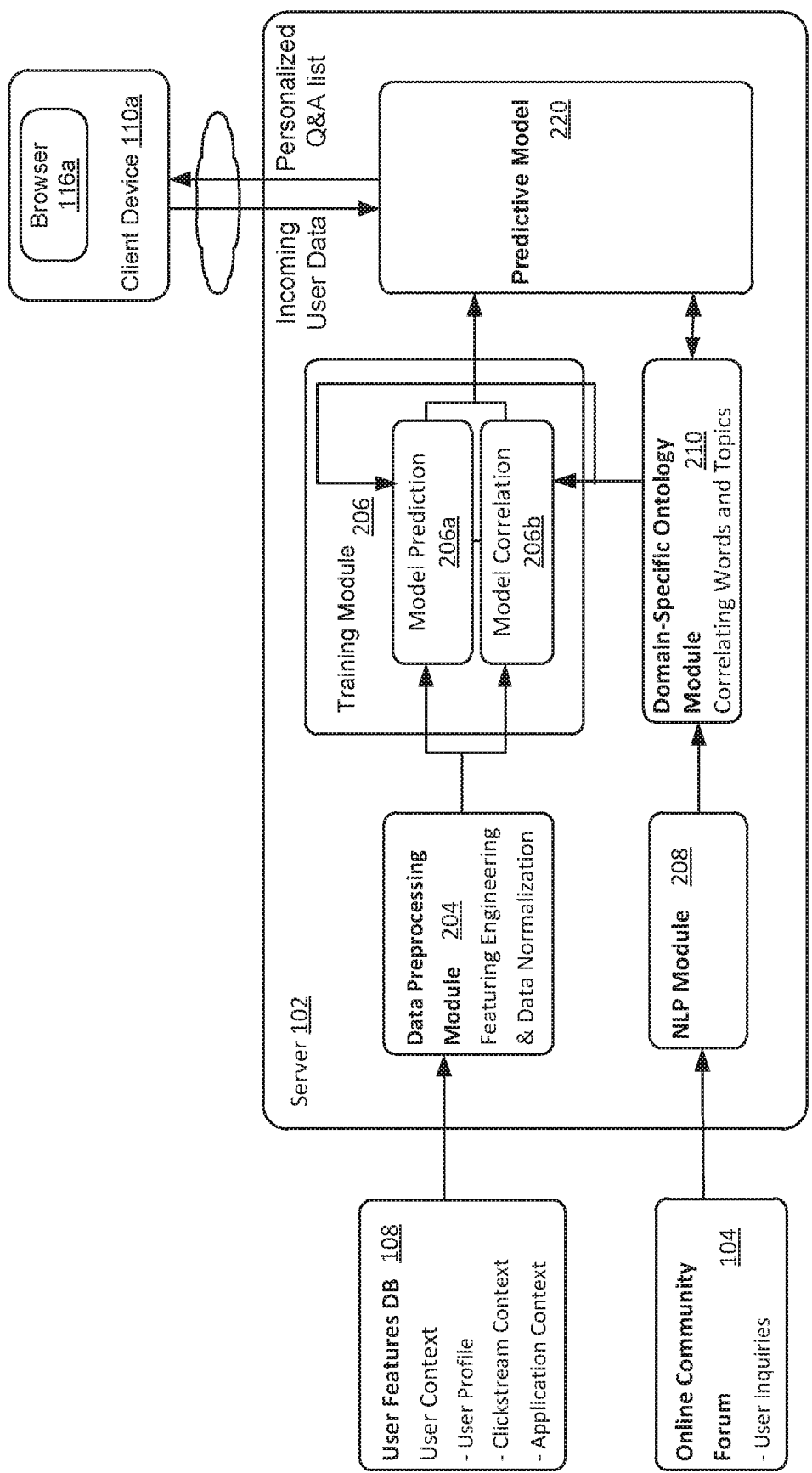
FIG. 2A illustrates an exemplary high-level structure of the server shown in FIG. 1 in accordance with aspects of the present disclosure.

FIG. 2A illustrates an exemplary high-level structure of the server 102 shown in FIG. 1 in accordance with aspects of the present disclosure. As shown, server 102 includes a data preprocessing module 204, a natural language processing (NLP) module 208, a domain-specific ontology module 210, a predictive model 220, and a training module 206.

Predictive model 220 learns a relationship between the historical user features and part-of-speech words, or tags, enhanced by a domain-specific ontology (e.g., constructed and operated by domain-specific ontology module), using a machine learning process. In one embodiment, predictive model 220 can include a decision tree model that computes a plurality of probabilities for each tag as associated with the user feature data. As used herein, a "tag" may be an item of metadata comprising part-of-speech words. In some embodiments, predictive model 220 can utilize other statistical analysis models, such as I Bayes, a neural network, a support vector machine, boosted trees, classification and regression tress (CART), or multivariate adaptive regression splines (MARS) logistic regression, among others.

A trained predictive model may predict tags for each user based on incoming user data using the learned relationships. In some embodiments, the operation of training the predictive model may be performed while offline, while the operation of predicting and providing personalized self-support service may be operated in real-time. In some embodiments, these components of the server can be distributed across different computing resources as part of a cloud-based computing system.

Data Fetching

Server 102 may receive or gather historical user feature data from a user feature database 202. The user feature data can include, for example, user context data and user clickstream data. User context data includes, for example, profile features specific to each user, such as age, gender, geographic location, interests, and the like. For example, in the context of a tax preparation application, user context data may include current and prior-year tax profile features specific to each user (e.g., income, age, number of dependents, and the like).

Clickstream context data includes clicks and the click paths that users have historically taken within an application. For example, clickstream data can include a sequence of HTTP requests made by the user to an online application, such as TURBOTAX®. In most cases, the requests correspond to a user clicking on a link or a button, such as a link to a support article on an online help forum. The clickstream context data may further capture the time when the users clicks on features in the online application. The clickstream context data may further include information regarding the screens that users linger on and whether the user goes back and forth between certain screens, or segments in the application. In addition, clickstream context data also can record the tab, subtab and information displayed on a screen, and the content (e.g., FAQs) that they click on. While the terms "click" and "clickstream" are used herein, it is understood that these techniques may also be applied to other forms of user interaction, such as touches on a touchscreen, gestures, voice commands, and the like.

Server 102 may also receive or gather application context data. For example, in the context of a tax preparation application, the server may gather e-file context data that includes e-file statuses that describe where in the filing process of a tax preparation application the user is at a given point in time. For example, the statuses may include: pending, prepared, succeeded agency, received, and rejected agency, among others. Timestamps may be associated with each e-file status change, such as when a user goes from a "pending" status to a "prepared" status.

Server 102 also fetches user inquiries from online community forum 104. User inquiries include historical searches and pieces of content that users clicked on in relation to the inquiries. For example, user inquiries can include questions posted by application users, answers to questions, and search terms that users enter for retrieving relevant content. In some instances, the user query data includes timestamps associated with each user activity, which may also retrieved to provide a sequence of behaviors by each user.

Data Preprocessing

Data preprocessing module 204 preprocesses the fetched user feature data before sending it to training module 206 as training data for training the predictive model. Data preprocessing module 204 can include feature engineering and data normalization processes to modify the user feature data in order to be prepare the user feature data for the machine learning training model.

For example, if the fetched data comprises raw data variables, data preprocessing module 204 may transform the raw data variables into feature data that can be analyzed and utilized by the predictive model. For example, the raw data variables can be transformed into feature data, such as user context, clickstream data, subtab context, etc.

Data preprocessing module 204 may also normalize the magnitudes of user feature data, for example to a scale between 0 and 1. Data normalization may be applied across user segments to ensure the data variables are comparable.

Natural Language Processing (NLP) module 208 fetches user inquiry data from online community forum 104. NLP module 208 parses and extracts words from the questions users click on based on the clickstream activity. The data stored within online community forum 104 may be leveraged to understand questions users ask at various steps within the online application, and are used to create a corpus of documents. This corpus of documents is used to extract the most frequent financial words as a function of their part-of-speech definition. The part-of-speech a word belongs to is done using part-of-speech (POS) tagging, which identifies the structure of a sentence and extracts the subject, verb and object within that sentence. Essentially, POS tagging aims to map the words within a sentence to the part-of-speech definition they pertain to, using the context and syntax of the word within the document. The top most frequent part-of-speech words from the entire corpus are computed and are used as key tags, or embedding, for high-dimensional representation for count-based models (i.e., tf-idf). The context from the questions that users most frequently click on within the online community forum provides information about the type of topics of discussion users need help with while using various online applications, such as TURBOTAX©.

Since not all words are relevant or significant for natural language processing, the NLP module 208 may ignore certain words, such as "the", "an", "with", etc., and then determines the most frequent words within the online community forum database. The NLP module may thereafter define a subset of the most frequent words in the forum 104, e.g., by counting the each occurrence of each unique word within the entire forum, then choosing the top n words as representative tags for the whole body of questions that makes up the online community forum. Here, n is any suitable positive integer, e.g., 200, for providing personalized self-support service.

For instance, a question posted in the online community forum 104, such as "can I claim my daughter", may be represented by single word tags (e.g., can, claim, daughter). Thus, a 5-word question can be represented by 3 tags representing words which are relevant or significant, thereby filtering out words such as "I" and "my". In addition to representing the relevant or significant words asked in the forum, these tags also reduce the dimensionality of the representation of each question (e.g., by reducing the number of words necessary to represent the question through filtering out irrelevant or insignificant words).

To enable machine comprehension of raw text, such as questions and their answers, NLP module 208 can create numerical representations of the words in the questions and answers in the form of high-dimensional vectors.

A high-dimensional representation of words in each sentence can defined by using a neural probabilistic language (NPL) model, such as tf-idf. The neural probabilistic language model represents (or embeds) words in a continuous vector space where semantically similar words (i.e., words that are related in terms of their meaning within a sentence) are mapped to nearby points in a high-dimensional (e.g., 300-dimensional) coordinate system. The neural probabilistic language model uses neural networks to predict a context of words. For example, from an incoming question "can I claim my", the neural probabilistic language model predicts, e.g., "daughter" to follow in the question.

For example, the NLP module 208 (e.g., using a tf-idf model) may process online community forum data containing question titles and answers to create high-dimensional representations of the relevant or significant words found in question titles (and answers) in the online community forum. Each relevant or significant word is represented in terms of the context of the surrounding words which it appears in through the online application forum. In other words, each relevant or significant word is represented as the probability distribution of the surrounding words. In the above example, for a word "claim," the corresponding, e.g., high-dimensional vector will capture the context of words "can," "I," "my," "daughter" (i.e., "claim" is a word in the sentence of "can I claim my daughter").

The raw text that is used to train the neural probabilistic language model is retrieved from the online community forum 104, which may include both questions and answers. By including the answers in the model, it is possible to get a better understanding of the distribution of words that make up each question and the contextual understanding of a specific subject matter, such as tax. After being processed by NLP module 108, or in conjunction with such processing, domain-specific ontology module 210 makes use of question data to identify additional correlations and connections among words and larger topics within the domain.

Domain-specific ontology module 210 constructs and operates a domain-specific ontology based on the questions (e.g., after they are processed by NLP module 208). For example, domain-specific ontology module 210 may identify correlations among words used in questions and larger concepts such as topics. In the domain of tax preparation, for example, domain-specific ontology module 210 may determine that certain terms are synonymous, or that that coincidence of two particular words indicates a particular subject, or that certain words are interrelated. Domain-specific ontology module 210 may generate a knowledge graph that identifies connections between words, and associations between words and topics. A knowledge graph may, for example, comprise a data structure wherein "knowledge" is mapped as relationships or associations among words and topics. In some embodiments, NLP module 208 and domain-specific ontology module 210 only process text in a portion of each question, such as in the question title, while in other embodiments the entire text of each question is processed. While NLP module 208 and domain-specific ontology module 210 are depicted as separate entities, the two may work in conjunction to construct a domain-specific ontology. The domain-specific ontology may, through techniques described herein involving mapping relationships among words and topics within a particular domain based on historical question data, provide a semantic and contextual environment in which to manage and associate knowledge with topics that particular groups of users typically interact with (e.g., by posting, searching, and/or accessing questions) under certain sets of circumstances.

A user may be associated with a list of tags that summarize all the questions asked by that user. In most cases, if questions are relevant, then their answers will also be relevant. Thus, the process result for each question can be applied to their respective answers. In one embodiment, user activity (e.g., clickstream data) within the online community forum 104 is used in conjunction with the domain-specific ontology to determine topics of interest to particular users or sets of users with similar user feature data as part of training the predictive model. For example, when a user clicks on 20 questions within an online community forum while using an online application displayed on browser 116a in FIG. 2A, the 20 questions may, for example, be reduced to 7 tags representing words or topics which are most representative of those 20 questions. In other words, the 7 tags may reflect the most common words or topics present within the 20 question titles. The domain-specific ontology may be used to determine topics associated with words present in the questions (e.g., by identifying connections in the knowledge model). By linking the user to the 7 tags, instead of 20 questions, the dimensionality of the resulting data can be reduced, which may ease the processing necessary to determine the relationship between the user feature data and tags representing words or topics.

Figure 2B:
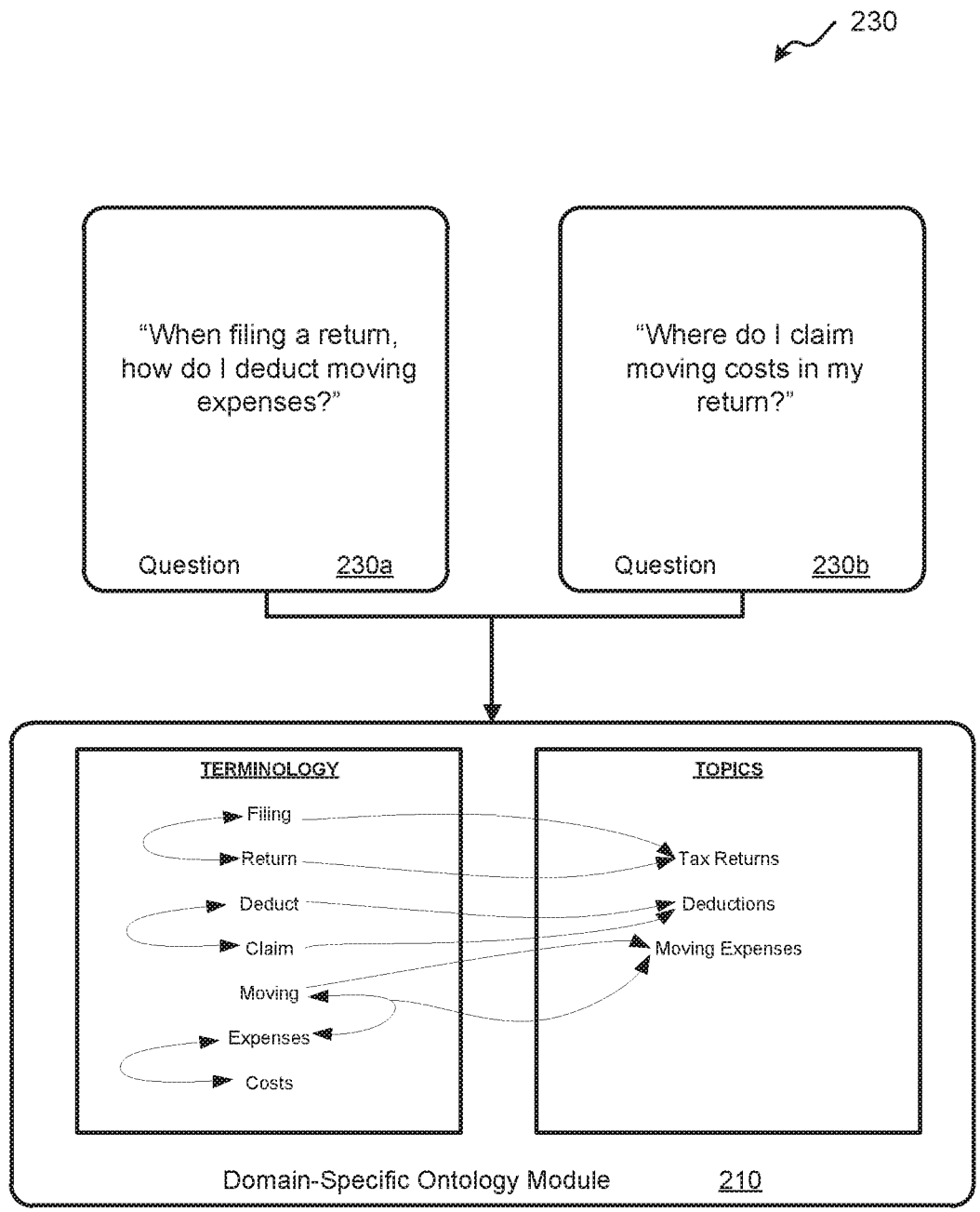
FIG. 2B illustrates an exemplary representation of constructing a domain-specific ontology according to embodiments of the present disclosure.

FIG. 2B illustrates an example representation 230 of a domain-specific ontology being constructed within domain-specific ontology module 210 based on questions 230a-b. As illustrated, domain-specific ontology module 210 retrieves questions 230a-b. For example, questions 230a-b may comprise user inquiries from online community forum 104 in FIG. 2A or from self-support knowledge DB 106 in FIG. 1. In some embodiments, questions 230a-b may have been processed by NLP module 208 prior to being retrieved by domain-specific ontology module 210 (e.g., into high-dimensional vectors). Domain-specific ontology module 210 may analyze the text of at least a portion of questions 230a-n (e.g., the titles) in order to identify correlations among words and determine associations between words and topics. Furthermore, domain-specific ontology module 210 may make use of historical data related to questions from the domain in order to develop a more detailed understanding of the ontology of the domain.

As shown in FIG. 2B, domain-specific ontology module 210 maps relationships among words used in questions as well as relationships between words and topics (e.g., themes, concepts, or ideas related to words). For example, based on questions 230a, which is titled "When filing a return, how do I deduct moving expenses?", and 230b, which is titled "Where do I claim moving costs in my return?", domain-specific ontology module 210 identifies words in the questions (e.g., from high-dimensional vectors received from NLP module 108) and determines connections between the words and between the words and topics. As shown, domain-specific ontology module 210 identifies a connection between the words "filing" and "return" because the words often appear together. Domain-specific ontology module 210 also identifies a connection between each of these words and the topic of "tax returns". Furthermore, domain-specific ontology module 210 identifies that "deduct" and "claim" can be synonymous in the domain of tax preparation, and that each of these words are related to the topic of "deductions". Additionally, domain-specific ontology module 210 identifies that the word "moving" is related to the topic "moving expenses". Also, domain-specific ontology module 210 identifies that the words "moving" and "expenses" often appear together, and that the combination of these words is related to the topic of "moving expenses". Furthermore, domain-specific ontology module 210 identifies that the words "expenses" and "costs" may be synonymous in the domain of tax preparation. As such, connections related to each of these synonymous words are propagated to the other.

While certain items and connections are shown in representation 230, it is understood that these items and connections are merely illustrative. For example, various other combinations of terms such as "deduct", "claim", "moving", "expenses", and "costs" may be further interrelated, and also may be related in other ways to the topics of "deductions", "tax returns", "moving expenses", and other topics.

The domain-specific ontology shown in representation 230 may be used to train predictive model 220 of FIG. 2A by identifying topics likely to be relevant to users with particular characteristics and/or behavior patterns under particular circumstances. For example, the domain-specific ontology may be used in conjunction with historical user context data (e.g., profile data, clickstream data, and the like) to identify correlations between particular sets of user context data and questions containing certain topics.

Predictive Model Training

The server 102 operates a predictive model 220 for personalizing the self-help experience, and a training module 206 for training the predictive model 220 through a machine learning process using historical data. The training module 206 can include a model prediction module 206a for predicting tags from the user feature data and a model correlation 206b for correlating user segments (e.g., groups of users with similar user feature data) with tags. In one embodiment, the predicted tags are related to the user feature data, and correlated tags are related to the user segment. Once the training process of the model prediction and correlation is complete, the predictive model 220 can merge the predicted tags and correlated tags and generate a respective high-dimensional vector for each object of user feature data.

Training module 206 uses user feature data, e.g., stored in user feature database 108, to establish relationships between the user's behavior and the types of questions. For example, the machine learning training module 206 can use the user's tax profile data and clickstream data to further influence the types of questions that best suit the user.

Training module 206 trains model prediction 206a and model correlation 206b components to identify user profile features based on user profile data, clickstream data, and the like to provide a personalized experience in reference to the type of content that is of most interest to the different user segments in user inquiries.

Model prediction 206a utilizes each user's profile feature to provide a unique user experience for each user. This is done, for example, by tailoring the types of questions that the users see in the self-help panel based on their features. In other words, the data that the user has entered in his profile is used to predict the most likely list of tags associated with the customer segment that he is part of.

In addition to user profile features, the clickstream data from each user is grouped into events that describe the user activity within an application, such as TURBOTAX®. An event is an activity or action associated with the user that can capture the user's behavior while using a software application. Some of the informative events for predicting the question tags can be extracted from the help care panel displayed on a screen of the online application, e.g., the number of clicks on certain questions presented in the panel, or the time spent on a certain screen, tab, subtab, and the like. This is accomplished, for example, by training a machine learning model based on, for example, current and prior year features for users who have previously searched or clicked on domain specific content within the online community forum.

Furthermore, additional events are revealed from clicks on specific user interface elements, such as the "contact us" button or the "like" button, and those events provide information about the probability that the user needs help and whether certain content was helpful or not.

The relationship between the user feature data and tags may be established using a random forest model, which learns the relationship between the features and tags, which then maps tags to the questions that a user has clicked on in the past. During runtime, this learned relationship is used to predict the tag probabilities for each online user leveraging user's feature data. The higher the probability associated with each tag, the greater the likelihood of that user to be linked to question titles that contain the corresponding tags.

One effective way for predicting the question tags is by analyzing a user's clicks on the question links presented in the help care panel of the online application (in which a list of self-support questions are displayed). From these question links, the model prediction 206a extracts the tags associated with what the user clicked on to identify the user's interest in a certain topic. This way, when the model prediction 206a computes the probabilities associated with each tag, it places more weight on tags related to content that the user has previously clicked on. Also, the clicks on the question links provide a strong indication about the type of content that the user is interested in and would find most helpful. Furthermore, clicks on particular types of buttons, such as a "contact us" button, a chat bot button, and/or a "like" button provide an indication about the probability that the user needs help and whether certain content was helpful or not to the user, as well as the sentiment of the user associated with certain forms of help, or content.

Model prediction 206a determines how the user feature data relates to the tags which are associated with each user by model correlation 206b. This enables the model prediction 206a to predict the tag probabilities given a set of user feature data. The model prediction 206a thereby provides insights into the type of topics that each individual is most likely to query or click on.

For each set of circumstances (e.g., application context such as filing status or particular page or tab of an online application), model correlation 206b models the probabilities linked to each tag, based on the number of customers and their historical behavior within that set of circumstances. For instance, users may be likely to ask about income tax in a "Federal Tax" tab when they have a "pending" e-file status. For example, the following tags and their probabilities may be related to a segment of users who clicked on content in the "Federal Tax" tab: federal with probability 0.9; taxes with probability 0.9; file with probability 0.8; income with probability 0.7; etc. In some examples, the tags and their associated probabilities may be stored in a one-dimensional array, such as a vector. For example, the vector may have a set format of alternating tags and probabilities within the vector elements. In other examples, the tags and their associated probabilities may be stored in a multi-dimensional array, such as a matrix.

Notably, the previous example with respect to the Federal Tax tab context is just one example. The correlation process can be applied to any other context, such as other tabs within the online application. Thus, using the correlation process, it is possible to predict a list of tags for each user based on a learned model from historical data.

Another important feature can be computed from the clickstream data, namely the time spent on a screen, tab or subtab. Once the model prediction 206a predicts the tags, the model correlation 206b identifies the most relevant topics of questions for users who spend various amounts of time on a screen. The time information teaches the model correlation 206b about the type of topics that customers are most interested in based on the time they spend on a screen.

The time that it takes users to go through a screen, tab or subtab can be indicative of whether users face any difficulty with navigating through the product, or might have questions with topics in the online application that they spend a long time hovering over.

Mapping Questions to Tags

In addition to preprocessing user inquires, NLP module 208 also can retrieve question-answer pairs from the online community forum (e.g., online community forum), extract the keywords, and analyze their contexts in conjunction with domain-specific ontology module 210.

Domain-specific ontology module 210 leverages the NLP capability from NLP module 208 in conjunction with the domain-specific ontology to create a mapping between each question asked in the online community forum and the tags for encoding each question. In some examples, the questions in the online community forum 104 are associated with a set of the highest frequency tags occurring within the question text and/or relevant to the question. Then, each set of high frequency tags associated with a question is transformed into a high-dimensional representation, such as a representation defined by a neural probabilistic language (NPL) model (e.g., tf-idf). In some examples, each question in the forum is represented by a unique vector. Further, each unique vector may be stored in a lookup table on server 102.

The data preprocessing module 204, NLP module 208, domain-specific ontology module 210, and training module 206 do not necessarily require real-time capability to make predictions associated with each user; instead, these module can be trained on historical data to model the types of questions users have asked in the past in relation to their features from user context, clickstream data, and subtab context, among others.

Trained Predictive Model

Trained predictive model 220 may be formed by merging, for each user, the predicted tags generated from model prediction 206a, with the correlated tags generated from model correlation 206b to assign personalized and relevant tags to each user. Then, the server identifies a number of questions related to the personalized tags for each user. This way, each user is mapped to a list of highly relevant and popular questions based on learnings extracted from the customers as segmented by their user feature data.

Predictive model 220 calculates relevancies between the high-dimensional vector of tag probabilities for a current user, and the high-dimensional vectors for each of the questions stored in the lookup table For example, relevancies may be determined based on a similarity score, which may comprise an angle between two high-dimensional vectors in terms of cosine similarity where smaller angles represent larger relevancies Subsequently, trained predictive model 220 ranks the questions in the lookup table in order of relevancy. Thereafter, trained predictive model 220 can return a certain number of the most relevant question titles to a client device for presentation to each user.

Figure 3:
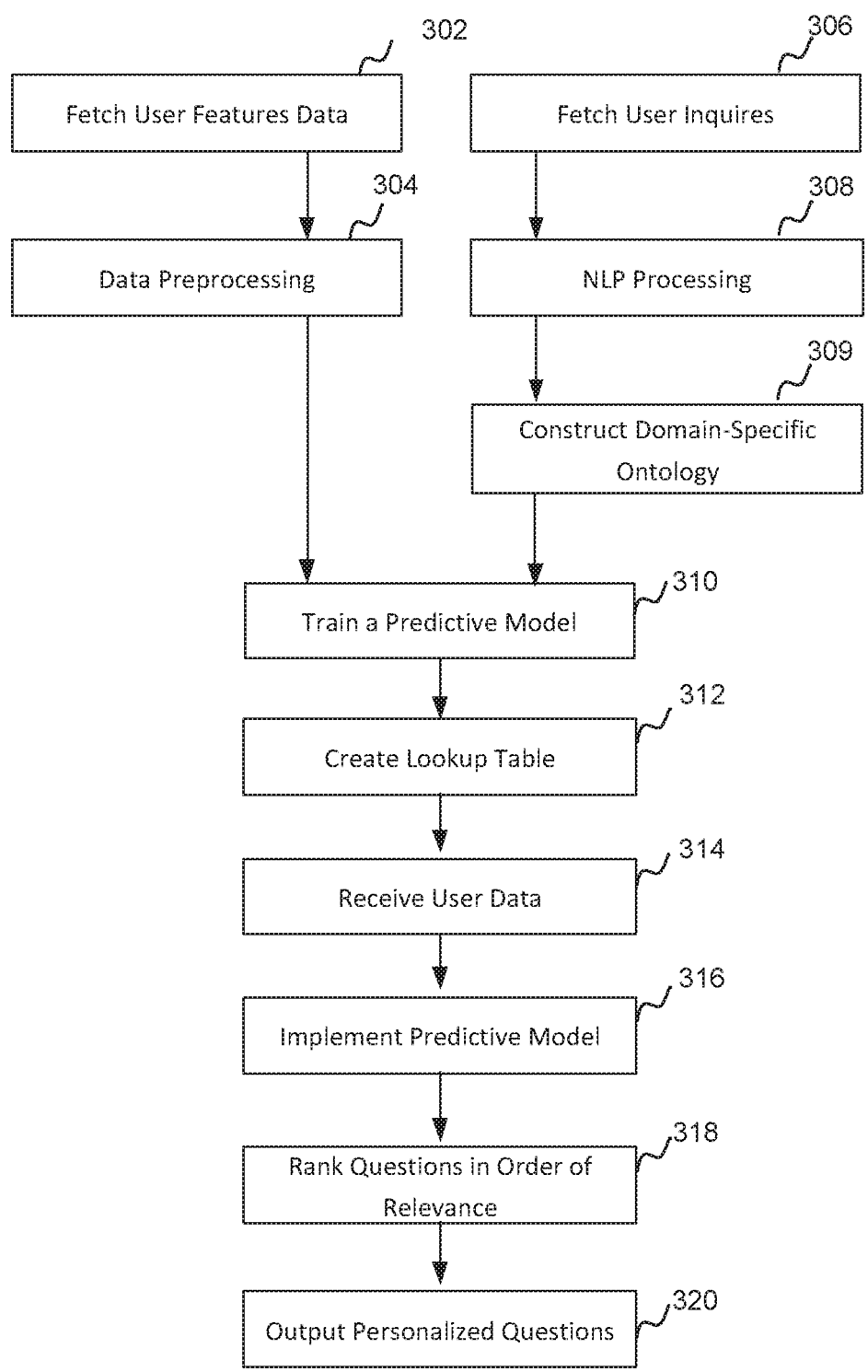
FIG. 3 illustrates an exemplary flowchart for personalizing the self-help experience in accordance with aspects of the present disclosure.

FIG. 3 illustrates an exemplary flowchart 300 for personalizing the self-help experience in accordance with aspects of the present disclosure. Flowchart 300 can be implemented by the server 102 of FIG. 2A. FIG. 3 illustrates the functionality and operation of possible implementations of systems, methods and computer program products according to various embodiments of the present disclosure. In this regard, each block in the flowchart may represent a module, segment, or portion of code, which comprises one or more executable instructions for implementing the specified logical function(s). In some alternative implementations, the functions noted in the block may occur simultaneously, substantially concurrently, or out of the order noted in the figure. Each block of the flowchart and combinations of blocks in the flowchart can be implemented by special-purpose hardware-based systems that perform the specified functions or acts, or combinations of special purpose hardware and computer instructions.

At step 302, the server fetches historical user feature data from a database, such as user feature database 202 of FIG. 2A. The historical user feature data may include user context data such as profile data, clickstream data, and the like.

At step 304, the fetched data is preprocessed according to techniques described herein (e.g., in the description of data preprocessing module 204 in FIG. 2A) to be used as training data for training the predictive model.

At step 306, the server also fetches historical user inquiries, which may include, for example, historical searches and pieces of questions that users clicked on in an online community platform, such as online community forum 104 of FIG. 2A. Subsequently, at step 308, the server performs natural language processing on the historical user inquiries to parse and extract words from historical user inquiries (e.g., as described with respect to NLP module 208 in FIG. 2A). Also, the server may extract self-support data sets (e.g., question and answer pairs) from the online community forum using natural language processing. The subject and details of questions may be identified along with a summary or totality of an answer to the question. The server may also associate metadata with the question-answer pairs, such as tags identifying topics.

At step 309, the server constructs and/or updates a domain-specific ontology based on the historical user inquiries. The server may, for example, identify and map correlations between words used in question titles and determine associations between words and topics. The server may use the domain specific ontology to map questions to tags representing words and/or topics related to the questions.

At step 310, the server trains a predictive model, such as predictive model 220 in FIG. 2A, to learn a relationship between user features and tags with their probabilities based on historical user feature data. Training the predictive model may include identifying tags (e.g., via model prediction 206a) and their probabilities based on the user feature data and correlating (e.g., via model correlation 206b) the user feature data with the tags and their probabilities. The predictive model may construct a plurality of decision trees in a random forest model using the user feature data, and calculate a mean prediction of individual decision trees to predict tags.

At step 312, the high-dimensional (e.g., 300 dimensional) vectors for question titles can be stored in a lookup table.

At step 314, the server obtains incoming user feature data (e.g., in real-time while a user uses the online application). The incoming user feature data can be generated based on user's activities within the online application and may include a user profile, clickstream data, and the like. The incoming user feature data also may also include the user's search inquiries and pieces of content that the user clicks on in the online community platform that is associated with the online application.

At step 316, the predictive model predicts tags and their probabilities based on the incoming user data, using the learned relationships established through training the predictive model.

The predictive model predicts tag probabilities for an online user using the learned relationship between the user features and tags. Then, a tag vector comprising predicted tag probabilities is assigned to the online user, and the high-dimensional representations from the natural language processing (e.g., via tf-idf) are retrieved for each tag. Subsequently, the weighted average vector is computed using the tag probabilities and the high-dimensional vectors. In one embodiment, by averaging the 300-dimensional vectors across all of tag probabilities which are predicted for the online user, a 300×1 final vector is obtained.

As an example, for a set of tags associated with a user (e.g., tag1, tag2, . . . tag200), assume that the following probability tag vector is predicted for the user:

Probability tag vector=[1, 0.8 . . . , 0.5]

Here, each tag has a high-dimensional representation generated from the natural language processing as described above in association with FIG. 2B. For example, tag1 can be "claim" which has a form of a 300-dimensional representation generated from the natural language processing. The average 300-dimensional vector computed for the 200-tag probabilities is: weighted average vector=([300×1 vector of tag 1]×0.1+[300×1 vector of tag 2]×0.8+ . . . +[vector of tag200]×0.5)/(0.1+0.8+ . . . +0.5). Finally, the calculated weighted average vector becomes a high-dimensional vector for the online user.

At step 318, the predictive model also can calculate relevancies (or similarities) between the high-dimensional vector of tag probabilities for the user, and the high-dimensional vectors for each of the questions stored in the lookup table. Subsequently, the questions stored in the lookup table may be ranked in order of relevancy to the user based on the user's high-dimensional vector of tag probabilities.

At step 320, the server returns a number of the most relevant question titles to the online application, for example, displayed on browser 116a on client device 110a in FIG. 2A. For example, the server may return ten of the most relevant question titles, based on those question title vectors having the smallest angle relative to the user's vector.

FIG. 4 illustrates an exemplary user interface (UI) screen of a tax preparation application in accordance with aspects of the present disclosure.

The screen 400 includes multiple tabs including Summary, Personal info, Federal Taxes, State Taxes, and eFile. By choosing one of these tabs, a user can navigate the UI screen to prepare and file a tax return. The UI screen also includes a self-support section 402 in which personalized and relevant topics are displayed, for example, in a form of questions and answers (Q&A).

As a user take actions within the UI screen of the online tax preparation application, the server obtains incoming user feature data. Server 102 calculates relevancies of the questions stored in the lookup table and returns the most relevant topics (e.g., question titles) for the user. The UI screen displays the relevant topics in the self-support section.

Figure 5:
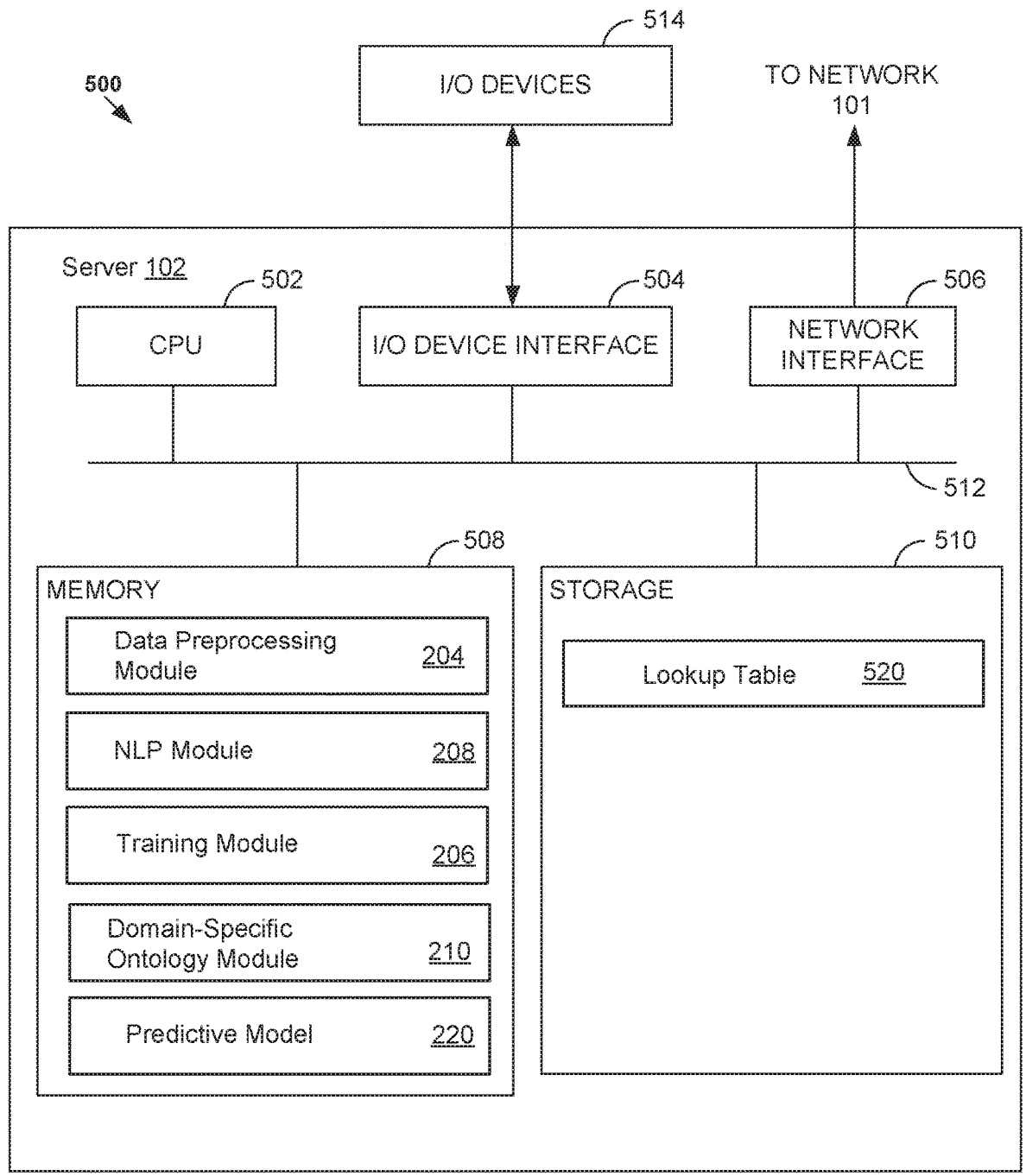
FIG. 5 illustrates a computer system with which some embodiments of the present disclosure may be implemented.

FIG. 5 illustrates an exemplary internal structure 500 of server 102 that assigns personalized and relevant topics to each user in accordance with aspects of the present disclosure. As shown, the server 102 includes a central processing unit (CPU) 502, one or more I/O device interfaces 504, which may allow for the connection of various I/O devices (e.g., keyboards, displays, mouse devices, pen input, etc.) to server 102, network interface 506 (which may include a transmitter for transmitting data and a receiver for receiving data), memory 508, storage 510, and interconnect 512. Storage 510 can locate either inside or outside the server 102. When the storage locates outside server 102, the storage can be connected via the network 101.

CPU 502 may retrieve and execute programming instructions stored in the memory 508. Similarly, CPU 502 may retrieve and store application data residing in the memory 508. Interconnect 512 transmits programming instructions and application data, among the CPU 502, I/O device interface 504, network interface 506, memory 508, and storage 510. CPU 502 can represent a single CPU, multiple CPUs, a single CPU having multiple processing cores, and the like. Additionally, memory 508 may represent volatile memory, such as random access memory. Furthermore, storage 510 may represent non-volatile memory, such as memory on a disk drive. Although shown as a single unit, storage 510 may be a combination of fixed or removable storage devices, such as fixed disc drives, removable memory cards or optical storage, network attached storage (NAS), or a storage area-network (SAN).

As shown, memory 508 stores programming instructions for executing data preprocessing module 204, NLP module 208, training module 206, domain-specific ontology module 210, and predictive model 220. Storage 510 stores a lookup table 520, which may store vectors representing questions and/or users. Data preprocessing module 204 fetches historical user feature data from a database, and preprocesses the fetched data to be used as training data for training the predictive model 220. NLP module 208 performs natural language processing on historical user inquiries to parse and extract tags, or part-of-speech words comprising of subject, verb and object, from the questions users click on based on the clickstream activity. Training module 206 trains a predictive model 220 to learn a relationship between user features and part-of-speech words, or tags, with their probabilities through a machine training process using historical user feature data. Domain-specific ontology module 210 identifies correlations and associations among words and/or topics, and associates metadata such as tags identifying words and/or topics with the question-answer pairs. Predictive model 220 predicts tags and their probabilities from the user features data. Predictive model 220 also can correlate the user feature data with tags and their probabilities, using the learned relationship. Predictive model 220 returns a certain number of the most relevant question titles to the client device for each user.

It may be noted that, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "component," "circuit," "module" or "system." Furthermore, aspects of the present disclosure may take the form of a computer program product embodied in one or more computer readable medium(s) having computer readable program code embodied thereon Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for providing a personalized self-support service to a user of an online application coupled with an online community forum, comprising:

obtaining a plurality of questions from the online community forum;

obtaining historical user data comprising: clickstream data of a plurality of users who accessed at least one of the plurality of questions; profile data of the plurality of users; and application context data of the plurality of users;

identifying a part-of-speech words in the plurality of questions from the online community forum;

generating a respective multi-dimensional vector for each question of the plurality of questions based on a frequency of the part-of-speech words for each respective question in the plurality of questions;

identifying one or more user features of the plurality of users based on the historical user data;

establishing one or more statistical correlations, based on the historical user data, between at least one of the one or more user features which is based on the application context data and the part-of-speech words;

training a predictive model using at least one of the one or more user features which is based on the profile data to predict part-of-speech words based on the historical user data;

determining, using the predictive model and the one or more statistical correlations, part-of-speech words relevant to the plurality of users;

predicting, using the trained predictive model, the one or more statistical correlations, and the part-of-speech words relevant to the plurality of users, part-of-speech words likely to be relevant to the user of the online application based on at least one user feature of the user of the online application;

generating a multi-dimensional vector for the user of the online application based on the predicted part-of-speech words;

computing a similarity metric between each of the multi-dimensional vectors for the plurality of questions and the multi-dimensional vector for the user of the online application;

ranking the multi-dimensional vectors for the plurality of questions in order of relevance based on the similarity metrics; and providing one or more relevant questions to the user of the online application via a user interface of the online application based on the ranking.

2. The method of claim 1, wherein providing one or more relevant questions to the user of the online application via a user interface of the online application based on the ranking comprises identifying the one or more relevant questions from the online forum which are represented by one or more of the multil-dimensional vectors for the plurality of questions which are most relevant.

3. The method of claim 1, wherein each of the multi-dimensional vectors for the plurality of questions comprises a weight associated with the part-of-speech word based on frequency.

4. The method of claim 1, wherein the identifying of the part-of-speech word comprises: identifying the part-of-speech word in the titles of the plurality of questions from the online community forum.

5. The method of claim 1, wherein providing the one or more relevant questions to the user of the online application via a user interface of the online application further comprises providing one or more corresponding answers.

6. The method of claim 1, wherein training the predictive model comprises building a random forest model including a plurality of decision trees.

7. The method of claim 1, wherein the online application comprises a tax preparation application and wherein the application context data comprises one or more of: electronic filing status data; tab data; and sub-tab data.

8. A non-transitory computer-readable storage medium containing instructions that, when executed, cause one or more processors to perform operations for providing a personalized self-support service to a user of an online application coupled with an online community forum, the operations comprising:

obtaining a plurality of questions from the online community forum;

obtaining historical user data comprising: clickstream data of a plurality of users who accessed at least one of the plurality of questions; profile data of the plurality of users; and application context data of the plurality of users;

identifying a part-of-speech word in the plurality of questions from the online community forum;

generating a respective multi-dimensional vector for each question of the plurality of questions based on a frequency of the part-of-speech word for each respective question in the plurality of questions;

identifying one or more user features of the plurality of users based on the historical user data;

establishing one or more statistical correlations, based on the historical user data, between at least one of the one or more user features which is based on the application context data and the part-of-speech word;

training a predictive model using at least one of the one or more user features which is based on the profile data to predict part-of-speech words based on the historical user data;

determining, using the predictive model and the one or more statistical correlations, part-of-speech words relevant to the plurality of users;

predicting, using the trained predictive model, the one or more statistical correlations, and the part-of-speech words relevant to the plurality of users, part-of- speech words likely to be relevant to the user of the online application based on at least one user feature of the user of the online application;

generating a multi-dimensional vector for the user of the online application based on the predicted part-of-speech words;

computing a similarity metric between each of the multi-dimensional vectors for the plurality of questions and the multi-dimensional vector for the user of the online application;

ranking the multi-dimensional vectors for the plurality of questions in order of relevance based on the similarity metrics; and providing one or more relevant questions to the user of the online application via a user interface of the online application based on the ranking.

9. The non-transitory computer-readable storage medium of claim 8, wherein providing one or more relevant questions to the user of the online application via a user interface of the online application based on the ranking comprises identifying the one or more relevant questions from the online forum which are represented by one or more of the multi-dimensional vectors for the plurality of questions which are most relevant.

10. The non-transitory computer-readable storage medium of claim 8, wherein each of the multi-dimensional vectors for the plurality of questions comprises a weight associated with the part-of-speech word based on frequency.

11. The non-transitory computer-readable storage medium of claim 8, wherein the identifying of the part-of-speech word comprises: identifying the part-of-speech word in the titles of the plurality of questions from the online community forum.

12. The non-transitory computer-readable storage medium of claim 8, wherein providing the one or more questions to the first user via a user interface of the online application further comprises providing one or more corresponding answers.

13. The non-transitory computer-readable storage medium of claim 8, wherein training the predictive model comprises building a random forest model including a plurality of decision trees.

14. The non-transitory computer-readable storage medium of claim 8, wherein the online application comprises a tax preparation application and wherein the application context data comprises one or more of: electronic filing status data; tab data; and sub-tab data.

15. A system comprising:

a processor; and a non-transitory computer-readable storage medium containing instructions that, when executed, cause the processor to perform operations for providing a personalized self-support service to a user of an online application coupled with an online community forum, the operations comprising:

obtaining a plurality of questions from the online community forum;

obtaining historical user data comprising: clickstream data of a plurality of users who accessed at least one of the plurality of questions; profile data of the plurality of users; and application context data of the plurality of users;

identifying a part-of-speech word in the plurality of questions from the online community forum;

generating a respective multi-dimensional vector for each question of the plurality of questions based on a frequency of the part-of-speech word for each respective question in the plurality of questions;

identifying one or more user features of the plurality of users based on the historical user data;

establishing one or more statistical correlations, based on the historical user data, between at least one of the one or more user features which is based on the application context data and one or more of the part-of-speech words;

training a predictive model using at least one of the one or more user features which is based on the profile data to predict part-of-speech words based on the historical user data;

determining, using the predictive model and the one or more statistical correlations, part- of-speech words relevant to the plurality of users;

predicting, using the trained predictive model, the one or more statistical correlations, and the part-of-speech words relevant to the plurality of users, part-of- speech words likely to be relevant to the user of the online application based on at least one user feature of the user of the online application;

generating a multi-dimensional vector for the user of the online application based on the predicted part-of-speech words;

computing a similarity metric between each of the multi-dimensional vectors for the plurality of questions and the multi-dimensional vector for the user of the online application;

ranking the multi-dimensional vectors for the plurality of questions in order of relevance based on the similarity metrics; and providing one or more relevant questions to the user of the online application via a user interface of the online application based on the ranking.

16. The system of claim 15, wherein providing one or more relevant questions to the user of the online application via a user interface of the online application based on the ranking comprises identifying the one or more relevant questions from the online forum which are represented by one or more of the multi-dimensional vectors for the plurality of questions which are most relevant.

17. The system of claim 15, wherein each of the multi-dimensional vectors for the plurality of questions comprises a weight associated with the part-of-speech word based on frequency.

18. The system of claim 15, wherein the identifying of the part-of-speech word comprises: identifying the part-of-speech word in the titles of the plurality of questions from the online community forum.

19. The system of claim 15, wherein providing the one or more relevant questions to the user of the online application via a user interface of the online application further comprises providing one or more corresponding answers.

20. The system of claim 15, wherein training the predictive model comprises building a random forest model including a plurality of decision trees.

21. The system of claim 15, wherein the online application comprises a tax preparation application and wherein the application context data comprises one or more of: electronic filing status data; tab data; and sub-tab data.

* * * * *